US009251847B2

(12) United States Patent
Haeberle et al.

(10) Patent No.: US 9,251,847 B2
(45) Date of Patent: Feb. 2, 2016

(54) DAMPING STRUCTURE FOR TAPE HEAD SYSTEM

(71) Applicant: International Business Machines Corporation, Armonk, NY (US)

(72) Inventors: Walter Haeberle, Waedenswil (CH); Mark A Lantz, Adliswil (CH); Hugo E Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/195,187

(22) Filed: Mar. 3, 2014

(65) Prior Publication Data
US 2015/0248915 A1   Sep. 3, 2015

(51) Int. Cl.
G11B 5/54 (2006.01)
G11B 5/55 (2006.01)
G11B 21/24 (2006.01)
G11B 5/008 (2006.01)
G11B 33/08 (2006.01)
G11B 5/48 (2006.01)

(52) U.S. Cl.
CPC .......... *G11B 21/24* (2013.01); *G11B 5/00813* (2013.01); *G11B 5/4833* (2013.01); *G11B 33/08* (2013.01)

(58) Field of Classification Search
CPC .... G11B 5/4833; G11B 33/08; G11B 7/0932; G11B 5/4826
USPC ............ 360/251.1–251.5, 261–261.3, 265.9, 360/266
See application file for complete search history.

(56) References Cited

U.S. PATENT DOCUMENTS

| | | | | | |
|---|---|---|---|---|---|
| 3,730,509 | A | * | 5/1973 | Jorn | 267/152 |
| 4,026,534 | A | * | 5/1977 | Barnwell et al. | 267/139 |
| 5,063,464 | A | * | 11/1991 | Astheimer et al. | 360/266 |
| 5,157,825 | A | * | 10/1992 | Kasahara | 29/896.9 |
| 5,280,402 | A | * | 1/1994 | Anderson et al. | 360/261.3 |
| 5,371,636 | A | * | 12/1994 | Nayak et al. | 360/75 |
| 5,414,578 | A | | 5/1995 | Lian et al. | |
| 5,949,619 | A | | 9/1999 | Eckberg et al. | |
| 6,069,867 | A | * | 5/2000 | Ikegame | 369/248 |
| 6,137,659 | A | * | 10/2000 | Warmenhoven | 360/261.1 |

(Continued)

FOREIGN PATENT DOCUMENTS

| | | |
|---|---|---|
| GB | 1508715 A | 4/1978 |
| GB | 2067821 A | 7/1981 |

OTHER PUBLICATIONS

Anderson, Sterling et al., "Viscoelastic Damping or Ortho-Planar Springs," Proceedings of ASME 2008 Internation Design Engineering Technical Conference & Computers and Information in Engineering Conference, Brooklyn, NY, USA, Aug. 6, 2008, pp. 1-8.

(Continued)

*Primary Examiner* — Adam B Dravininkas
(74) *Attorney, Agent, or Firm* — Tutunjian & Bitetto, P.C.; Jeff Tang

(57) ABSTRACT

A tape head system. The tape head system includes: a head for reading from and/or writing to magnetic tape; a support; and at least one leaf spring assembly supporting the head moveably relative to the support so as to allow the head to follow a motion of the tape, the at least one leaf spring assembly including at least one leaf spring and at least one damping element configured for damping a motion of the head relative to the support.

20 Claims, 4 Drawing Sheets

(56) References Cited

U.S. PATENT DOCUMENTS

| | | | |
|---|---|---|---|
| 6,603,727 B1* | 8/2003 | Ohtsuka | 720/684 |
| 2002/0163763 A1 | 11/2002 | Budde | |
| 2003/0007294 A1* | 1/2003 | McReynolds et al. | 360/265.9 |
| 2003/0210499 A1* | 11/2003 | Arya | 360/234.6 |
| 2010/0208389 A1* | 8/2010 | Ikeji | 360/244.2 |

OTHER PUBLICATIONS

Renninger, Jennifer, "Understanding Damping Techniques for Noise and Vibration Control," Aearo Company, [online], [Retreived on Oct. 10, 2013], available at http://www.earsc.com/pdfs/engineering/understandingdamping.pdf.

* cited by examiner

DAMPING STRUCTURE FOR TAPE HEAD SYSTEM

BACKGROUND OF THE INVENTION

1. Field of the Invention

The present invention relates to tape systems. More particularly, the present invention relates to tape head systems.

2. Description of the Related Art

In modern tape systems, data is organized in data tracks which are written and read back in a parallel fashion by a read and write head having servo read, data read, and data write elements, i.e. transducer elements. These data tracks run in a longitudinal direction of the magnetic tape and are much narrower than the excursions the magnetic tape experiences in the lateral direction as a result of imperfections in the mechanical entrainment system. Therefore, it is crucial to accurately position the head relative to the magnetic tape as the magnetic tape is streamed. To this end, modern tape systems provide for track-following functionality ensuring that the head follows the lateral motion of the tape as it is transported over the head in order to keep the read and write transducers centered on a desired track location. Also, tape systems are known which provide for a tape skew following functionality ensuring that the head assumes a desired angular orientation with respect to the magnetic tape. The tape skew following functionality is essential in enabling read-while-write-verify functionality as the track width is scaled to smaller dimensions. The track following functionality as well as the skew following functionality can be implemented as closed loop control systems.

One challenge in the design of tape drives is maintaining the performance of the closed loop control systems under vibration conditions. Tape head systems providing the track following or tape skew following functionality are typically implemented with voice coil actuators, and are relatively well-modeled as mass-spring systems with fundamental resonance frequencies in the range of tens of Hz up to 100 Hz. Under typical vibration conditions in tape drives ranging from 0 up to a few hundred Hz, the tape head systems are excited at their fundamental resonance frequency resulting in degraded track following or tape skew following performance. Higher-order resonance modes of the tape head systems are typically well above the frequency range of applied vibrations and are hence not efficiently excited and; therefore, less of an issue.

According to one approach, it is known to add damping to the tape head systems to improve track following and tape skew following performance, especially at the fundamental resonance frequency.

SUMMARY OF THE INVENTION

According to a first aspect of the present invention, a tape head system is provided. The tape head system includes: a head for reading from and/or writing to a magnetic tape; a support; and at least one leaf spring assembly supporting the head moveably relative to the support so as to allow the head to follow a motion of the magnetic tape. The at least one leaf spring assembly includes at least one leaf spring and at least one damping element configured for damping the motion of the head relative to the support.

According to another aspect of the present invention, a tape head system is provided. The tape head system includes: a head for reading and/or writing to a magnetic tape; a support; and a plurality of leaf spring assemblies, wherein each of the plurality of spring assembly connects the head to the support and the each of the plurality of leaf spring assemblies includes at least one leaf spring and at least one damping element.

BRIEF DESCRIPTION OF THE DRAWINGS

In the following, an exemplary embodiment of the present invention is described with reference to the enclosed figures.

DETAILED DESCRIPTION OF THE PREFERRED EMBODIMENTS

Figure 1:
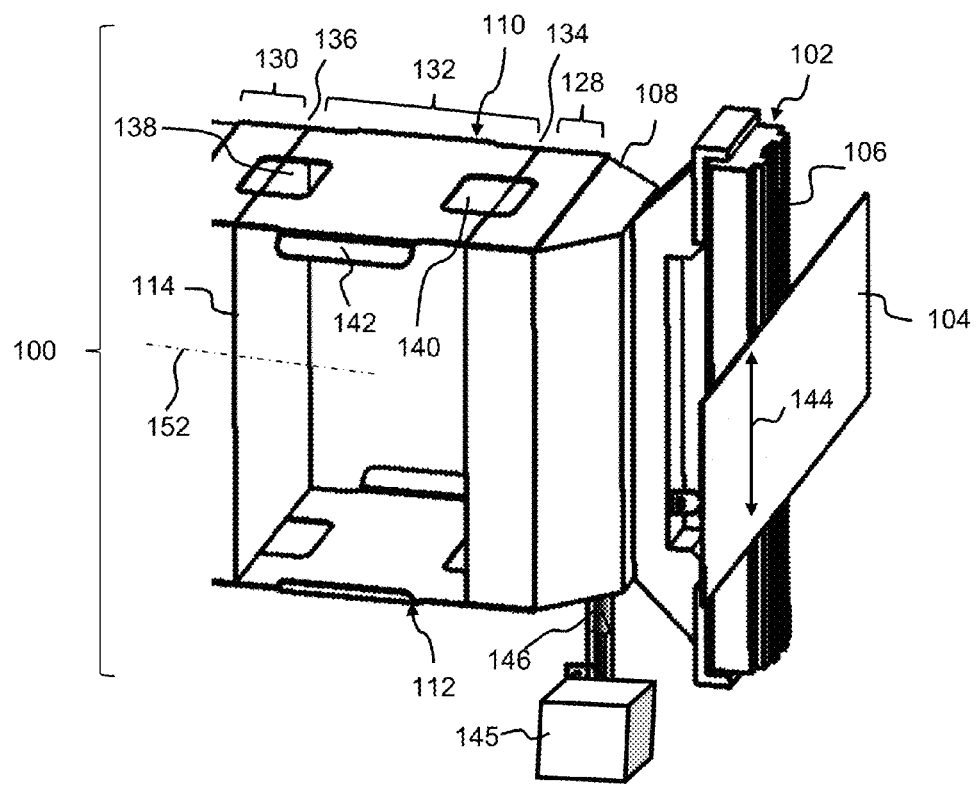
FIG. 1 shows a perspective view of a tape head system, according to an embodiment of the present invention.

FIG. 1 shows a tape head system 100 according to an embodiment of the present invention. Tape head system 100 is integrated into a tape drive (not shown). Tape head system 100 has a head 102 for reading from and writing to magnetic tape 104. Head 102 includes read and/or write elements 106, i.e. transducers, for reading and writing tracks on tape 104. Head 102 also has a base 108. Base 108 is supported by two leaf spring assemblies 110, 112 with respect to a support 114.

Figure 3:
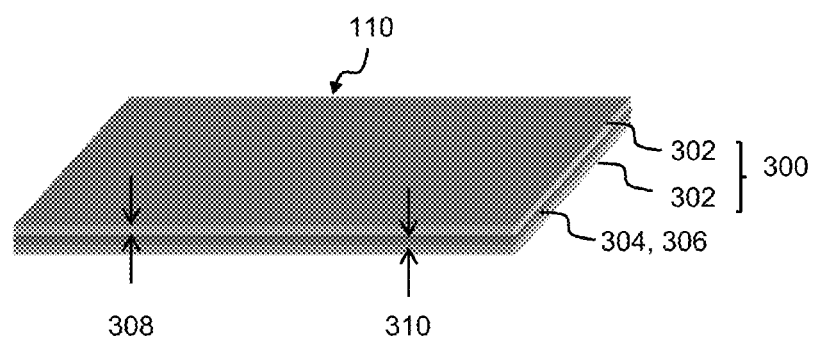
FIG. 3 shows a leaf spring assembly, according to an embodiment of the present invention.
Figure 4:
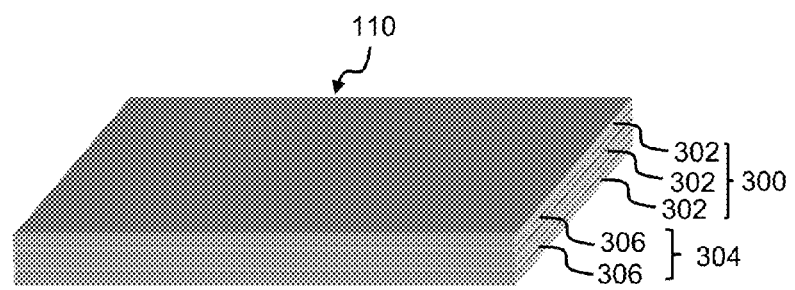
FIG. 4 shows a leaf spring assembly, according to an embodiment of the present invention.

Each leaf spring assembly 112, 110 can be configured as shown in FIG. 3 or FIG. 4.

One general idea is to use a leaf spring in combination with a damping element. When the tape head system is excited, the motion of the head relative to the support is thus dampened. Excitations of the tape head system, especially at the fundamental resonance frequency, can result from external vibrations (i.e. external to the tape head system, for example vibrations of the rollers guiding the tape) or from the control effort applied by an actuator controlling the motion of the head. One object is to damp out the external vibrations transmitted via the leaf spring assembly to the head. Another object is to dampen out the fundamental resonance inherent to the spring-mass system formed by the leaf spring and head. This improves the controllability of closed-loop track-follow, in particular.

The leaf spring flexes as the tape follows the motion of the magnetic tape. At the same time, the damping element is compressed or tensioned. As the damping element is compressed or tensioned, energy is dissipated, thus providing for the desired damping effect.

A "leaf spring" presently refers to any planar spring which, by flexure, provides for a relative movement between two components connected by the spring. Such springs are also termed ortho-planar springs.

The damping element can be configured such that the amount of damping is proportional to velocity. The damping element thus provides no resistance to motion at zero velocity.

The head can be configured as a data read and/or write head. The head can also be configured as a servo-read and/or write head. Generally speaking, the head includes at least one read and/or write element configured for writing and/or reading data or server tracks.

According to an embodiment, the at least one damping element includes a visco-elastic material. A visco-elastic material is a material that exhibits both viscous and elastic characteristics, when undergoing deformation. The visco-elastic material can have an amorphous structure. By using a visco-elastic material, a desired frequency response of the tape head system can be obtained.

According to a further embodiment, the visco-elastic material is a polymer. Examples of suitable polymers are rubber, silicone elastomers such as polydimethylsiloxane (PDMS), and elastomer-based adhesives.

According to a further embodiment, the at least one leaf spring includes metal. For example, the leaf spring can be made of spring steel, copper beryllium, or aluminium.

According to a further embodiment, the at least one damping element is partially integrated into the at least one leaf spring. Thus, the damping element is somewhat built into the leaf spring. This can, for example, be achieved by having a leaf spring having multiple layers and having a damping element including multiple layers, where the layers of the damping element are arranged between layers of the leaf spring. By building the damping element somewhat into the leaf spring, a mechanical coupling between the leaf spring and the damping element is obtained. Thus, the deformation of the leaf spring is somewhat dependent on the deformation of the damping element. Thereby, the frequency response of the tape head system can be optimized.

According to a further embodiment, the at least one damping element is formed as at least one layer that is bonded to at least one layer of the at least one leaf spring. This bond can be obtained, for example, by adhesive bonding of the damping element (or layer of the same) to the leaf spring (or layer of the same). According to another embodiment, or in addition, the layer of the damping element can include at least one surface feature that interlocks with at least one surface feature of the leaf spring (positive fit).

According to a further embodiment, the at least one leaf spring has at least two layers and the at least one damping element has at least one layer, the at least one layer of the at least one damping element being arranged in between the at least two layers of the at least one leaf spring. The layer of the damping element can be bonded on either side to a respective layer of the leaf spring. Thus, a sandwich-type structure is obtained, which is compact and well suited to undergo a high number of bending cycles.

According to a further embodiment, the at least one leaf spring has a plurality of layers and the at least one damping element has a plurality of layers, where one layer of the at least one damping element is arranged between every two layers of the at least one leaf spring. Again, a sandwich-type structure is obtained, where, in a thickness direction, layers of the leaf spring are arranged alternatingly with layers of the damping element.

According to a further embodiment, at least one layer of the at least one leaf spring has a thickness ranging from 5 to 100 µm. In one embodiment, the thickness of the layer of the leaf spring ranges from 20 to 50 µm. The at least one layer of the at least one leaf spring can have a square or rectangular shape. The length of the square or rectangle can range from 5 to 25 mm, and the width to length ratio of the square or rectangle can range from ½ to 10. In this or another embodiment, the length ranges from 10 to 16 mm and the width from 7 to 12 mm.

According to a further embodiment, at least one layer of the at least one damping element has a thickness ranging from 0.1 to 10 times the thickness of the at least one layer of the at least one leaf spring. In another embodiment, the thickness of the at least one layer of the damping element ranges from 30 to 75 µm. The at least one layer of the at least one damping element can have a square or rectangular shape. Preferably, the length and width dimensions of the square or rectangle extend to the boundaries of the at least one layer of the at least one leaf spring, but both these dimensions can also be smaller.

According to a further embodiment, a motion of the head following the magnetic tape is configured to take place in a direction normal to the plane of the at least one leaf spring in an undeflected state. For example, an actuator and, in particular, a push rod of an actuator, can be connected to the head. The actuator moves the head in the direction normal to the plane of the at least one leaf spring in an undeflected state. The actuator can be part of a closed loop control system controlling the motion of the head relative to the tape. Thereby, a track following functionality or tape skew following functionality can be provided.

According to a further embodiment, the at least one leaf spring and/or the at least one damping element has at least one opening in an area that is configured to flex, when the head moves to follow the magnetic tape. In this manner, the frequency response of the tape head system can be optimized.

According to a further embodiment, the at least one spring assembly has a first portion connected to the head and a second portion connected to a support. The first and second portion of the spring assembly can each include a portion of the leaf spring and the damping element. Further, the spring assembly can include a third portion in between the first and the second portion, the third portion having a portion of the leaf spring and the damping element. The first and third portion as well as the second and third portion can be connected by a first and second hinge, respectively. The first and second hinge can be formed by reducing the cross-section of the leaf spring (and the damping element, if desired) at the point of the respective hinge, e.g. by providing the above-mentioned opening.

According to a further embodiment, at least two spring assemblies are provided, the at least two spring assemblies being spaced apart from each other and arranged parallel to each other. Preferably, each spring assembly connects the head to the support. Thus, a parallelogram-type mechanism is obtained. Therefore, the angular orientation of the head does not change as the head moves as the head follows the motion of the magnetic tape.

According to a further embodiment, the head is configured to follow a tape lateral motion and/or a tape skew. "Lateral motion" means a direction at right angles to the streaming direction of the tape and in the same plane as the tape. "Tape skew" means rotation of the tape in the plane of the tape. In other words, the long axis of the head should be perpendicular to the streaming direction of tape and a deviation from the perpendicular is referred to as tape skew. The support can be itself supported in a rotatable manner about an axis running perpendicular to the plane of the tape. A (further) actuator can actuate the support for rotation of the same about the axis in order for the head to follow the tape skew. A (further) spring assembly can be provided to limit angular rotation of the support (and thus the head) around the axis to acceptable levels, even at resonance frequency.

In an embodiment according to FIG. 3, leaf spring assembly 110 (this also applies to leaf spring assembly 112, not shown) has a leaf spring 300 having two layers 302. A damping element 304 including a single layer 306 is arranged in between layers 302. Layer 306 can include a visco-elastic material in the form of a polymer. For example, Scotch tape 467 Hi performance adhesive from 3M Corporation can be used. Layers 302 can be formed from spring steel. Layers 302 can each have a thickness 308 of 30 μm, and layer 306 can have a thickness 310 of 50 μm. Layer 306 is bonded on respective sides to layers 302.

In an alternative embodiment, as shown in FIG. 4, three layers 302 are interposed with layers 306. Thus, the spring assembly 110 of FIG. 4 includes five layers in total.

Now returning to FIG. 1, it is shown that each spring assembly 110, 112 can include three portions, a first portion 128, a second portion 130, and a third portion 132. First portion 128 is connected to base 108, and second portion 130 is connected to support 114. Hinges 134, 136 can be formed between first and third portions 128, 132 and second and third portions 130, 132. These hinges are obtained by having, for example, rectangular cut-outs 138, 140 inside leaf spring assembly 110, thus reducing the resistance to flexure of leaf spring assembly 110 at those areas.

Leaf spring assembly 110 can also be provided with flaps 142 extending on either side of third portion 132, providing third portion 132 with an increased resistance to flexing.

Leaf spring assembly 112 is arranged parallel and spaced apart from leaf spring assembly 110 but is otherwise formed identically to leaf spring assembly 110. Thus, leaf spring assemblies 110, 112 form a parallelogram-type of mechanism allowing head 102 to move in tape lateral direction 144, while head 102 keeps its angular orientation.

Figure 2:
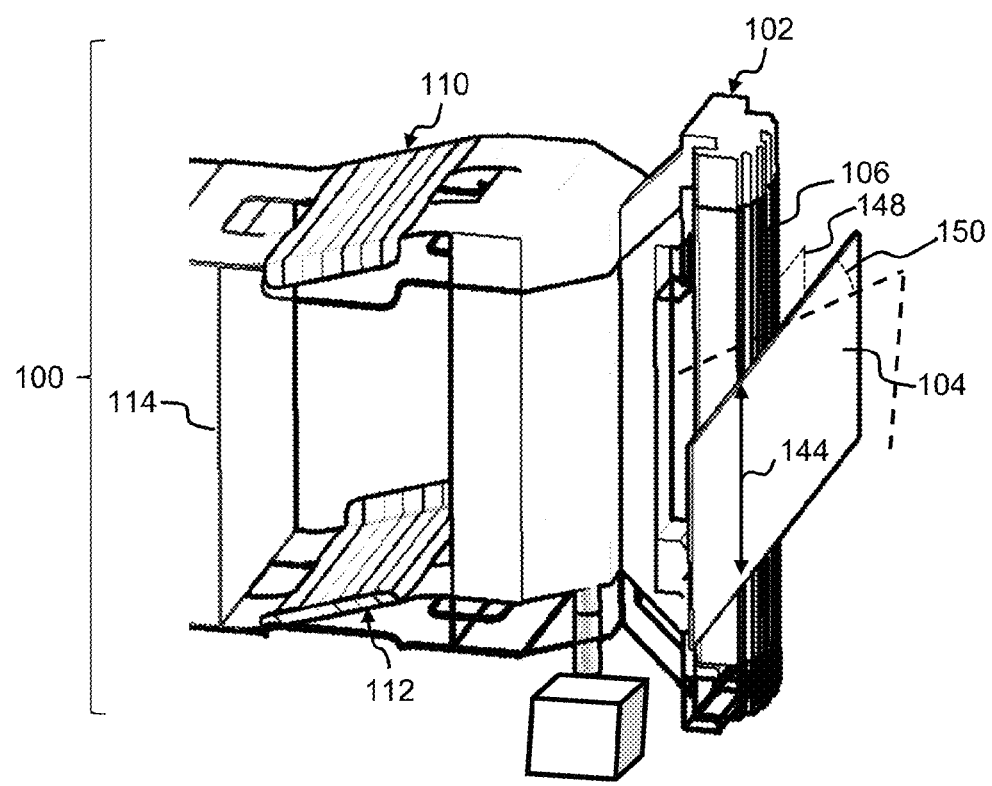
FIG. 2 shows the tape head system of FIG. 1 in a deflected state, according to an embodiment of the present invention.

Tape head system 100 also includes an actuator 145 having a push rod 146 which is connected to base 108 of head 102. Actuator 145 can be part of a closed loop control system which adjusts the position of head 102 in lateral direction 144 relative to tape 104 in order to keep read and/or write elements 106 aligned with tracks on tape 104. FIG. 1 shows the undeflected state for tape head system 100. Portions 128, 130, 132 of a respective spring assembly 110, 112 lie in a single plane in the undeflected state. When push rod 146 pushes head 102 in lateral direction 144, this movement is orientated normal to the single plane. As head 102 is moved in lateral direction 144, leaf spring assemblies 110, 112 deform as shown in FIG. 2.

Tape head system 100 provides for a track following functionality. Also or instead, tape head system 100 can be used to provide for a tape skew following functionality.

The angle between tape 104 and head 102 without tape skew is indicated at 148 and is equal to 90 degrees (and lies in the plane of the tape 104). The skew angle is indicated at 150 for a tape shown in dashed lines that runs skew.

This tape skew following functionality, which aims at maintaining angle 150 as small as possible, can be provided by supporting support 114 in a rotatable manner about an axis 152 shown in FIG. 1. Axis 152 runs perpendicular to the plane of tape 104. A further actuator (not shown) actuates support 114 for rotation of the same about axis 152. A further spring assembly 110 of the type shown in FIGS. 1 to 4 can be provided to limit angular rotation of support 114 around axis 152 to acceptable levels, even at resonance frequency.

Figure 5:
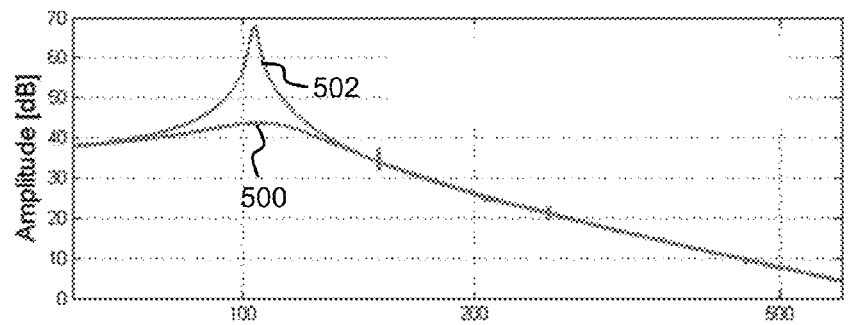
FIG. 5 shows a diagram of amplitude vs. frequency for the tape head system of FIG. 1, according to an embodiment of the present invention.
Figure 6:
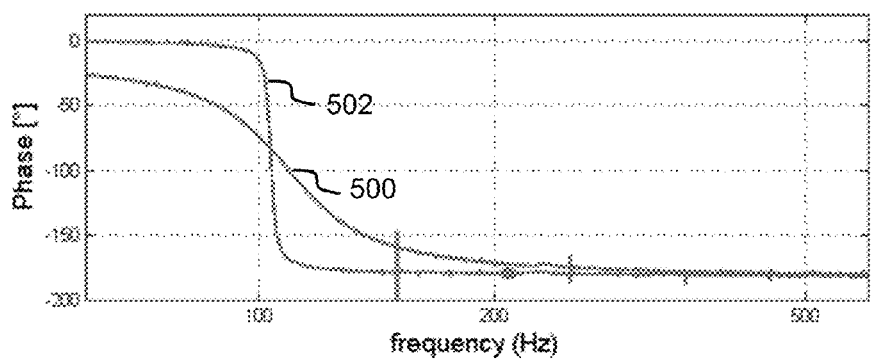
FIG. 6 shows a diagram of phase angle vs. frequency for the tape head system of FIG. 1, according to an embodiment of the present invention.

FIGS. 5 and 6 show the frequency response (amplitude and phase angle) of tape head system 100 of FIG. 1 indicated at 500. In the experimental set-up, tape head system 100 was excited by actuator 145 via push rod 146 and the response (amplitude and phase angle) was measured at head 102. Due to the configuration of leaf spring assemblies 110, 112, the amplitude of motion of tape head system 100 at its fundamental resonance frequency is maintained at an acceptable level, as illustrated in FIGS. 5 and 6.

Also, FIGS. 5 and 6 show the frequency response if tape head system 100 of FIG. 1 is designed without damping element 304 and is excited, which results—as indicated at 502—in large excitations of tape head system 100 at the fundamental resonance frequency, which are undesirable.

Although the present invention has been described in accordance with preferred embodiments, it is obvious for a person skilled in the art that modifications are possible in all embodiments.

What is claimed is:

1. A tape head system comprising:
a head for reading from and/or writing to a magnetic tape;
a support; and
at least one leaf spring assembly supporting the head moveably relative to the support so as to allow the head to follow a motion of the tape, the at least one leaf spring assembly including at least three leaf springs and at least one damping element disposed between adjacent leaf springs in a multi-layered stack, the multi-layer stack being configured to dampen multi-dimensional motion, wherein the at least one damping element is configured for damping a motion of the head relative to the support.

2. The tape head system of claim 1, wherein the at least one damping element comprises a visco-elastic material.

3. The tape head system of claim 1, wherein the at least three leaf springs comprise metal.

4. The tape head system of claim 1, wherein the at least one damping element is partially integrated into at least one layer of the at least three leaf springs.

5. The tape head system of claim 1, wherein the at least one damping element is formed as at least one layer that is bonded to at least one layer of the at least three leaf springs.

6. The tape head system of claim 1, wherein at least one layer of the at least three leaf springs has a thickness ranging from 5 to 100 μm.

7. The tape head system of claim 1, wherein at least one layer of the at least one damping element has a thickness ranging from 30 to 75 μm.

8. The tape head system of claim 1, wherein at least one layer of the at least one damping element has a thickness ranging from 0.1 to 10 times the thickness of at least one layer of the at least three leaf springs.

9. The tape head system of claim 1, wherein at least one layer of the at least three leaf springs has a square or rectangular shape.

10. The tape head system of claim 1, wherein at least one layer of the at least one damping element has a square or rectangular shape.

11. The tape head system of claim 1, wherein a motion of the head following the magnetic tape is configured to take place in a direction normal to the plane of the at least three leaf springs in an undeflected state.

12. The tape head system of claim 1, wherein the at least three leaf springs include at least one opening in an area that is configured to flex when the head moves to follow the magnetic tape.

13. The tape head system of claim 1, wherein the at least one spring assembly has a first portion connected to the head and a second portion connected to the support.

14. The tape head system of claim 1, wherein a plurality of spring assemblies are provided, the plurality of spring assemblies being spaced apart from each other and arranged parallel to each other.

15. The tape head system of claim 1, wherein the head is configured to follow a tape lateral motion and/or a tape skew.

16. The tape head system of claim 1, wherein the at least one leaf spring assembly further comprises flaps extending outwardly mid-span from the multi-layered stack.

17. The tape head system of claim 1, wherein the at least one damping element includes at least one opening in an area that is configured to flex when the head moves to follow the magnetic tape.

18. A tape head system comprising:
a head for reading and/or writing to a magnetic tape;
a support; and
a plurality of leaf spring assemblies, wherein each of the plurality of leaf spring assemblies connects the head to the support and the each of the plurality of leaf spring assemblies includes at least three leaf springs and at least one damping element disposed between adjacent leaf springs in a multi-layered stack, the multi-layer stack being configured to dampen multi-dimensional motion;
wherein the at least one damping element is configured for damping a motion of the head relative to the support.

19. The tape head system of claim 18, wherein the at least one damping element is formed as at least one layer that is bonded to at least one layer of the at least three leaf springs.

20. The tape head system of claim 18, wherein each of the plurality of leaf spring assemblies further comprises flaps extending outwardly mid-span from the multi-layered stack.

\* \* \* \* \*